(12) United States Patent
Kim et al.

(10) Patent No.: US 7,238,221 B2
(45) Date of Patent: *Jul. 3, 2007

(54) METALLIC NICKEL POWDERS, METHOD FOR PREPARING THE SAME, CONDUCTIVE PASTE, AND MLCC

(75) Inventors: Soon-ho Kim, Seoul (KR); Jae-young Choi, Gyeonggi-do (KR); Do-kyung Kim, Daejeon-si (KR); Je-hyeong Park, Gangwon-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 348 days.

This patent is subject to a terminal disclaimer.

(21) Appl. No.: 10/819,918

(22) Filed: Apr. 8, 2004

(65) Prior Publication Data

US 2004/0200318 A1  Oct. 14, 2004

(30) Foreign Application Priority Data

Apr. 8, 2003  (KR) ...................... 10-2003-0021919

(51) Int. Cl.
*B22F 9/24* (2006.01)
(52) U.S. Cl. .......................................... 75/365; 75/374
(58) Field of Classification Search .................. 75/348, 75/374

See application file for complete search history.

(56) References Cited

U.S. PATENT DOCUMENTS 3,850,612 A * 11/1974 Montino et al. .............. 75/370
4,539,041 A   9/1985 Figlarz et al.
6,120,576 A   9/2000 Toshima et al.
6,974,492 B2 * 12/2005 Harutyunyan et al. ........ 75/351
2006/0090601 A1 * 5/2006 Goia et al. .................... 75/374

FOREIGN PATENT DOCUMENTS

KR  2002-094069 A  * 12/2002

* cited by examiner

*Primary Examiner*—George Wyszomierski
(74) *Attorney, Agent, or Firm*—Buchanan Ingersoll & Rooney PC

(57) ABSTRACT

Provided are a method for preparing metallic nickel powders capable of decreasing the content of an alkaline metal in the metallic nickel powders, metallic nickel powders with the low content of an alkaline metal, a conductive paste including metallic nickel powders with the low content of an alkaline metal, and a multi-layer ceramic capacitor (MLCC) including a nickel inner electrode with the low content of an alkaline metal. The method for preparing the metallic nickel powders includes heating a mixture including an organic base, a nickel precursor compound, and a polyol. Wherein, the nickel precursor compound is converted to the metallic nickel powders through reduction by the organic base and the polyol. In the method, the organic base is used instead of the hydroxide of an alkaline metal such as NaOH and KOH. Therefore, the content of an alkaline metal such as sodium and potassium that can be incorporated as an impurity into the metallic nickel powders can be significantly reduced.

15 Claims, 8 Drawing Sheets

METALLIC NICKEL POWDERS, METHOD FOR PREPARING THE SAME, CONDUCTIVE PASTE, AND MLCC

BACKGROUND OF THE INVENTION

This application claims the priority from Korean Patent Application No. 2003-21919, filed on Apr. 8, 2003, in the Korean Intellectual Property Office, the disclosure of which is incorporated herein by reference in its entirety.

1. Field of the Invention

The present invention relates to metallic nickel powders and a method of preparing the same. The present invention also relates to a multi-layer ceramic capacitor (MLCC).

2. Description of the Related Art

Multi-layer ceramic capacitors (MLCCs) are stacked structures of multiple thin dielectric layers and multiple inner electrodes. Such MLCCs can achieve a large capacitance even in a small volume, and thus, have been widely used in various electronic equipments such as computers and mobile communication devices.

An Ag—Pd alloy has been used as a material for inner electrodes of MLCCs. Due to its sinterability in the air, the Ag—Pd alloy can be easily utilized in manufacturing MLCCs. However, the Ag—Pd alloy is costly. Since the late 1990s, to decrease the manufacturing cost of MLCCs, inexpensive nickel has been used as a material for inner electrodes. A nickel inner electrode for MLCCs is made from a conductive paste containing metallic nickel powders.

Metallic nickel powders are prepared by a gas phase method or a liquid phase method. Due to relatively easy control of the shapes of metallic nickel powders and impurities, the gas phase method has been widely used. However, the gas phase method is unfavorable for fine powder formation and mass production. On the other hand, the liquid phase method is favorable for mass production, and its initial capital and process costs are low.

The liquid phase method is classified into two types. In the first type, nickel hydroxide is used as a starting material to be converted into metallic nickel powders. In the second type, a nickel precursor material, such as nickel salt and nickel oxide, except nickel hydroxide, is used as a starting material to be converted into metallic nickel powders.

The first type is relatively simple. However, there are disadvantages in that nickel hydroxide, which is the staring material, is expensive and the particle size of metallic nickel powders is not easily controlled.

Even though the second type is relatively complicated, there are advantages in that an inexpensive nickel precursor material such as nickel sulfate, nickel chloride, and nickel acetate can be used as the starting material and the particle size of powders can be easily controlled in the range of several nanometers to several hundreds nanometers.

Illustrative examples of the liquid phase method are disclosed in U.S. Pat. Nos. 4,539,041 and 6,120,576.

U.S. Pat. No. 4,539,041 discloses a method for preparing metal powders by dispersing the oxide, hydroxide, or salt of gold, palladium, platinum, iridium, osmium, copper, silver, nickel, cobalt, lead, or cadmium in liquid polyol which is a reducing agent, followed by heating.

U.S. Pat. No. 6,120,576 discloses a method for preparing metallic nickel powders, which includes the steps of mixing an aqueous sodium hydroxide solution with an aqueous solution of nickel sulfate to produce nickel hydroxide; reducing the resultant nickel hydroxide with hydrazine to produce nickel; and recovering the nickel thus produced.

Nickel hydroxide is often used as a starting material or an intermediate in the liquid phase method because it is easily reduced, relative to other types of nickel compounds.

In the second type, an alkaline is added to convert a nickel precursor compound to nickel hydroxide. The alkaline that is generally used is either sodium hydroxide (NaOH) or potassium hydroxide (KOH). In this case, impurities such as sodium (Na) and potassium (K) may remain on the surfaces of metallic nickel powders. Since sodium and potassium have low surface energy, they are not easily removed from the metallic nickel powders.

Metallic nickel powders for high capacitance MLCCs must have more enhanced electric conductivity and contain a smaller quantity of impurities that adversely affect the capacitance of dielectrics. An alkaline metal such as sodium and potassium lowers both the electric conductivity of nickel electrodes and the capacitance of dielectrics.

SUMMARY OF THE INVENTION

The present invention provides a method for preparing metallic nickel powders with the low content of alkaline metals.

The present invention also provides metallic nickel powders with the low content of alkaline metals.

The present invention also provides a conductive paste comprising metallic nickel powders with the low content of alkaline metals.

The present invention also provides a multi-layer ceramic capacitor (MLCC) comprising a nickel inner electrode with the low content of alkaline metals.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
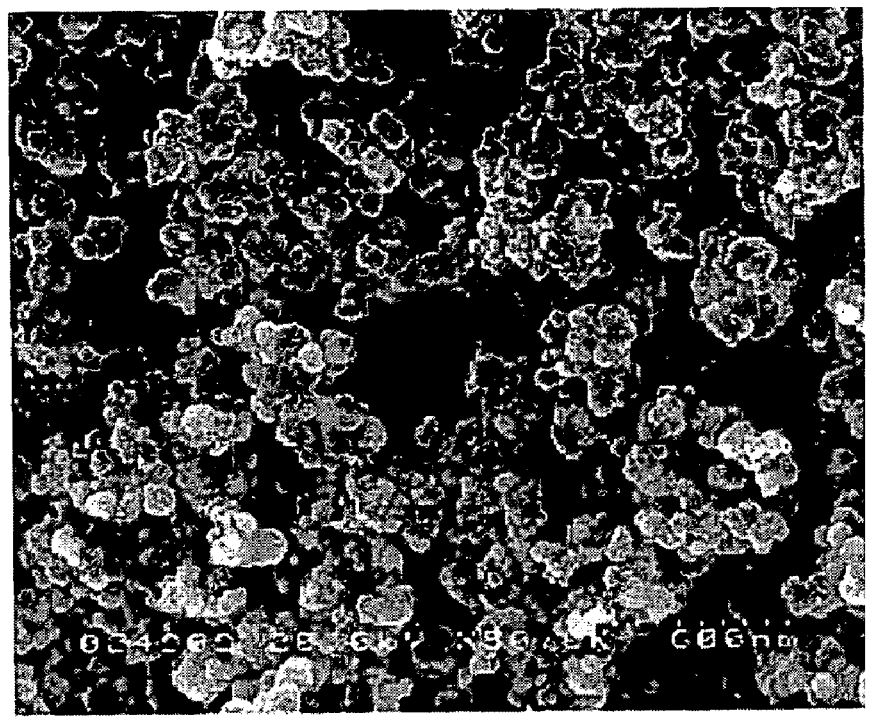
FIGS. 1 and 2 are respectively a scanning electron microscope (SEM) photograph and a X-ray diffraction (XRD) analysis result of metallic nickel powders according to an embodiment of the present invention.

The present invention provides a method for preparing metallic nickel powders, comprising heating a mixture including an organic base, a nickel precursor compound, and a polyol, wherein the nickel precursor compound is converted into metallic nickel through reduction by the organic base and the polyol.

As known experimentally, the nickel precursor compound is most easily reduced to the metallic nickel at a pH of about 9 to about 11. The organic base mainly serves to adjust the pH of the mixture to an appropriate value. In the present invention, the organic base is used instead of the hydroxide of an alkaline metal such as NaOH and KOH. Therefore, incorporation of alkaline metal impurities such as sodium and potassium into metallic nickel powders can be prevented.

Examples of the organic base include tetramethylammonium hydroxide (TMAH), tetraethylammonium hydroxide (TEAH), tetrabutylammonium hydroxide (TBAH), tetrapropylammonium hydroxide (TPAH), benzyltrimethylammonium hydroxide, dimethyldiethylammonium hydroxide, ethyltrimethylammonium hydroxide, tetrabutylphosphonium hydroxide, trimethylamine (TMA), diethylamine (DEA), and ethanolamine, which can be used alone or in combination.

There are no particular limitations on the content of the organic base in the mixture. For example, the mixture may include the organic base in an amount so that the initial pH of the mixture is preferably about 9 or more, more preferably about 10 or more. For a more illustrative example, the initial content of the organic base in the mixture may be in a range of about 1 to 10 moles, based on 1 mole of the nickel precursor compound.

There are no particular limitations on the nickel precursor compound provided that it is a nickel-containing compound that can be reduced to the metallic nickel by the polyol in the presence of the organic base. The nickel precursor compound may be nickel oxide (NiO), nickel salt, or the like. Examples of the nickel salt include nickel sulfate, nickel nitrate, nickel chloride, nickel bromide, nickel fluoride, nickel acetate, nickel acetylacetonate, and nickel hydroxide. These nickel precursor compounds may be used alone or in combination.

The poyol serves as a solvent that dissolves the organic base and the nickel precursor compound. The polyol also serves as a reducing agent that reduces the nickel precursor compound to the metallic nickel. The polyol is an alcoholic compound having two or more hydroxyl groups. An example of polyol used as a reducing agent is disclosed in U.S. Pat. No. 4,539,041.

Examples of the polyol include aliphatic glycol, which is a diol, and aliphatic glycol polyester.

Examples of the aliphatic glycol include alkylene glycols with a main chain of $C_2$ to $C_6$ such as ethanediol, propanediol, butanediol, pentanediol, and hexanediol; and polyalkylene glycols derived from the alkylene glycols, for example, polyethylene glycols.

Another examples of the aliphatic glycol include diethylene glycol, triethylene glycol, and dipropylene glycol.

Another example of the polyol includes glycerol which is a triol.

The polyol is not limited to the above-described polyol based compounds. The polyol based compounds may be used alone or in combination.

More preferably, the polyol may be ethyleneglycol, diethyleneglycol, triethyleneglycol, tetraethyleneglycol, propanediol-1,2, propanediol-1,3, dipropyleneglycol, butanediol-1,2, butanediol-1,3, butanediol-1,4, or butanediol-2,3.

There are no particular limitations on the initial content of the polyol in the mixture. The initial content of the polyol may be appropriately determined by the solubility of the nickel precursor compound. For example, at an early stage, the mixture may include the polyol in an amount so that the concentration of the nickel precursor compound is in a range of about 0.01 to about 0.5 moles.

To facilitate the reduction of the nickel precursor compound to the metallic nickel, the method of the present invention includes heating the mixture including the organic base, the nickel precursor compound, and the polyol. In the present invention, the "heating" indicates raising the temperature of the mixture including the organic base, the nickel precursor compound, and the polyol to a temperature exceeding room temperature, specifically about 20° C. For example, the heating comprehends raising the temperature of a mixture of the polyol of less than room temperature, the organic base of less than room temperature, and the nickel precursor compound of less than room temperature placed into a reaction vessel to a point above room temperature. For another example, the heating comprehends simply placing the polyol of more than room temperature, the organic base of less than room temperature, and the nickel precursor compound of less than room temperature into a reaction vessel. A temperature during the heating may be a constant value or may be gradually changed within a predetermined range exceeding room temperature. Ordinary persons skilled in the art may use various other easy heating methods within the scope of the present invention.

More preferably, to facilitate the reduction even more, the temperature for the heating may be at least about 45° C.

Generally, as the temperature for the heating increases, the reduction is even more facilitated. However, at more than a certain temperature, the facilitation of the reduction may be saturated, furthermore, the deterioration of the reactants may be caused. In this regard, the temperature for the heating may be preferably about 350° C. or less.

The polyol serves as a solvent for the organic base and the nickel precursor compound, as well as a reducing agent. Therefore, during the heating, the polyol must be maintained in a liquid phase.

The method of the present invention may be carried out in an open vessel or in a closed vessel. In a case where the temperature for the heating is increased above the boiling point of the polyol and/or the boiling point of the organic base, it is preferable to use a closed vessel.

In the case of using a closed vessel, when the temperature for the heating is increased above the boiling point of the polyol and/or the boiling point of the organic base, the inner pressure of the reaction vessel increases, but the polyol and the organic base can be maintained in a liquid phase. A closed vessel has therein an appropriate volume ratio of a gas phase region and a liquid phase region.

An open or closed vessel that can be used herein may include a condenser or a reflux condenser.

During the heating, the composition of the mixture is changed with time. At an early stage of the heating, the mixture includes the organic base, the nickel precursor compound, and the polyol. While the reduction of the nickel precursor compound to the metallic nickel proceeds, the nickel precursor compound and metallic nickel particles may coexist in the mixture. In the case of using the nickel precursor compound except nickel hydroxide, a portion of nickel precursor compounds may be converted into nickel hydroxide and then reduced to metallic nickel powders. The remainder of the nickel precursor compounds may be directly reduced to metallic nickel powders without being converted to nickel hydroxide. After a predetermined time, substantially all of the nickel precursor compounds are reduced to metallic nickel powders. The duration for the heating may vary depending on the temperature for the heating. Ordinary persons skilled in the art can easily find a reasonable heating duration, and thus, the duration for the heating is not an important factor in implementing the present invention.

In another embodiment of the method of the present invention, the mixture may further include water. In this case, the reduction of the nickel precursor compound to the metallic nickel is generally performed in two steps.

In the first step, conversion of the nickel precursor compound to nickel hydroxide occurs predominantly. This is because the reaction of the organic base with the water produces more hydroxyl ions, and the hydroxyl ions thus produced facilitates the formation of nickel hydroxide. During the first step, a considerable amount of the nickel precursor compound is converted to nickel hydroxide and most water is removed from the mixture by evaporation.

In the second step, reduction of the nickel hydroxide to metallic metal occurs predominantly. Water, which is an oxidizing agent, may inhibit the reduction of the nickel hydroxide. However, since water is removed during the first step, the reduction of the nickel hydroxide in the second step is not adversely affected.

The above two steps may be continuously carried out without being distinctly divided.

The above two steps may proceed at a constant heating temperature. In this case, the heating temperature is preferably above the boiling point of water. Specifically, the heating temperature ranging from about 100 to 350° C. is preferred. In the first step, evaporated water may return to the mixture after condensed using a reflux condenser or may continuously discharge from a reactor. In the case of the former, to proceed the second step, evaporated water must be discharged from a reactor after the reflux of the water is stopped.

The first step may be proceeded at a heating temperature different from that for the second step. In this case, the first step may proceed at less than the boiling point of water and the second step may proceed at more than the boiling point of water. For example, the first step may proceed at a heating temperature of about 45 to 100° C., and the second step may proceed at a heating temperature of about 100 to 350° C.

During the above two steps, almost all nickel precursor compounds are converted to nickel hydroxide and then reduced to metallic nickel powders. Only a little of nickel precursor compounds are directly reduced to metallic nickel powders. Due to the unification of the reaction pathway, metallic nickel powders prepared from the mixture containing water have uniform shapes and narrow particle size distribution.

In a case wherein water is further added to the mixture, there are no particular limitations on the initial content of the water in the mixture. For example, the initial content of the water in the mixture may be in a range of about 0.1 to about 10 moles, based on 1 mole of the organic base.

In another embodiment of the method of the present invention, the mixture may further include a mono-ol. The mono-ol is a straight or branched alcoholic compound with one hydroxyl group. Examples of the mono-ol include methanol, ethanol, propanol, butanol, pentanol, and hexanol. There are no particular limitations on the initial content of the mono-ol in the mixture. For example, the initial content of the mono-ol in the mixture may be in a range of about 0.1 to 10 moles, based on 1 mole of the organic base.

In another embodiment of the method of the present invention, the mixture may further include a nucleation agent. The nucleation agent serves to allow the metallic nickel powders precipitated after reduction to have more uniform particle sizes. The nucleation agent may be $K_2PtCl_4$, $H_2PtCl_6$, $PdCl_2$, or $AgNO_3$. There are no particular limitations on the content of the nucleation agent in the mixture. For example, the content of the nucleation agent in the mixture may be in a range of about 1/10,000 to 2/1,000 moles, based on 1 mole of the nickel precursor compound. Typically, the content of the nucleation agent in the mixture may be about 0.1% of the nickel precursor compound.

According to another aspect of the present invention, there is provided metallic nickel powders with sodium content of about 0.1 to about 50 ppm, preferably about 0.1 to about 25 ppm. There are no particular limitations on the particle size of the metallic nickel powders. For example, the metallic nickel powders may have a particle size of about 20 to about 300 nm. The metallic nickel powders can be easily prepared by the above-described method using the organic base. The metallic nickel powders of the present invention can be utilized in various applications such as a material for inner conductive lines of electronic circuits and a catalyst. In particular, the metallic nickel powders of the present invention are very suitable as a material for inner electrodes in multi-layer ceramic capacitors (MLCCs) because of the very low content of an alkaline metal.

According to another aspect of the present invention, there is provided a conductive paste including metallic nickel powders, an organic binder, and an organic solvent, wherein the metallic nickel powders has a sodium content of about 0.1 to about 25 ppm and a particle size of about 20 to about 300 nm. The metallic nickel powders can be easily prepared by the above-described method. The organic binder may be, for example, ethylcellulose. The organic solvent may be terpineol, dihydroxy terpineol, or 1-octanol kerosene. In the conductive paste of the present invention, the content of the metallic nickel powders may be about 40 wt %, the content of the organic binder may be about 15 wt %, and the content of the organic solvent may be about 45 wt %. However, the composition is provided only for illustration, and thus, various compositions can be used depending on where to use the conductive paste. The conductive paste of the present invention may further include an additive such as a plasticizer, an anti-thickening agent, and a dispersant. The conductive paste of the present invention can be prepared by one of various known methods, and thus, the detailed descriptions thereof are omitted.

According to another aspect of the present invention, there is provided a MLCC including a nickel inner electrode, wherein the nickel content of the nickel inner electrode is in a range of about 0.1 to about 25 ppm.

Figure 15:
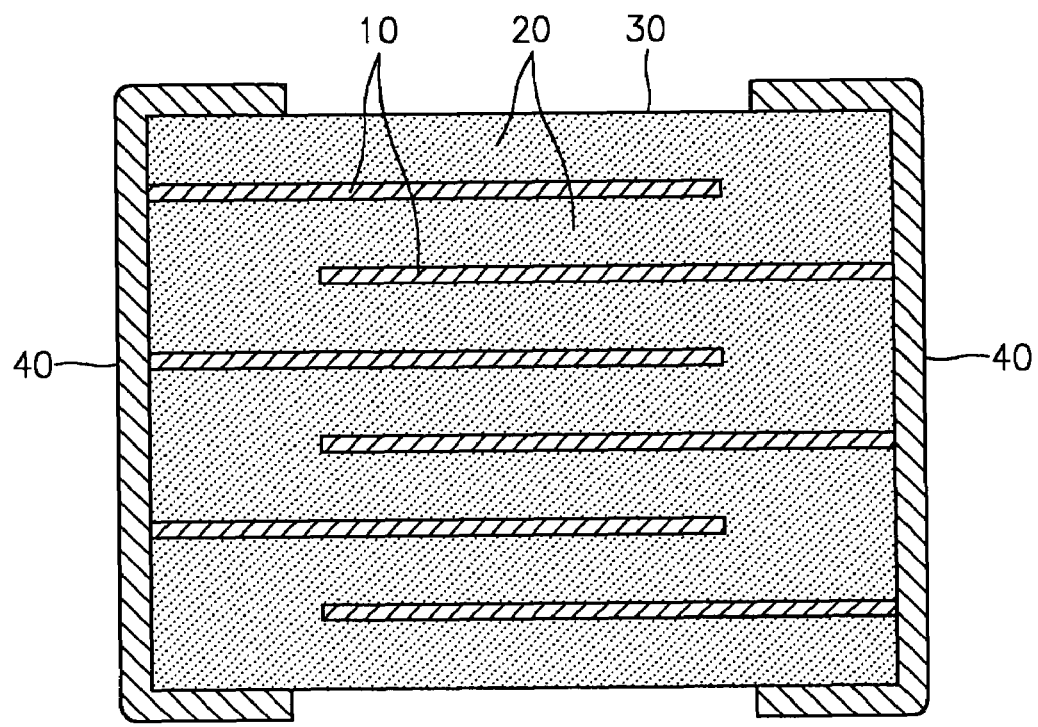
FIG. 15 is an example of a multi-layer ceramic capacitor (MLCC) according to the present invention.

An illustrative example of the MLCC of the present invention is shown in FIG. 15. The MLCC of FIG. 15 includes a laminate 30 made up of inner electrodes 10 and dielectric layers 20, and terminal electrodes 40. In order for each of the inner electrodes 10 to be contacted to one of the terminal electrodes, a tip of each of the inner electrodes is exposed on a side of the laminate 30.

An example for manufacturing the MLCC of the present invention is as follows. A paste for forming the dielectric layers and the conductive paste of the present invention are alternately printed. The laminate thus obtained is sintered. A conductive paste is coated on both sides of the sintered laminate 30 so as to be electrically and mechanically contacted to the tips of the inner electrodes 10 exposed at the sides of the laminate 30, followed by sintering, to form the terminal electrodes 40.

The MLCC of the present invention is not limited to the illustrative example of FIG. 15 and may vary in terms of shape, dimension, the number of lamination, and circuit construction.

Hereinafter, the present invention will be described more specifically by Examples. However, the following Examples are provided only for illustrations and thus the present invention is not limited to or by them

EXAMPLES

Example 1

TMAH 23 g of TMAH (tetramethylammonium hydroxide) was dissolved in 250 ml of ethylene glycol to prepare a first solution. 20 g of Ni(CH$_3$COO)$_2$.4H$_2$O was dissolved in 250 ml of ethylene glycol to prepare a second solution. 0.0332 g of K$_2$PtCl$_4$, which is a nucleation agent, was dissolved in 2 ml of ethylene glycol to prepare a third solution. The first solution, the second solution, and the third solution were placed into a reactor provided with a reflux condenser and then stirred.

The resultant mixture in the reactor was heated using a heating mantle equipped with a magnetic stirrer at 190° C. for 6 hours to produce metallic nickel powders. The produced metallic nickel powders were separated with filtration and then washed with distilled water. The metallic nickel powders thus obtained were dried in a vacuum oven at 25° C. overnight.

The metallic nickel powders of Example 1 were photographed using a scanning electron microscope (SEM) and the results are shown in FIG. 1. As shown in FIG. 1, the metallic nickel powders of Example 1 were spherical and had a particle size of about 50 to about 90 nm.

Figure 2:
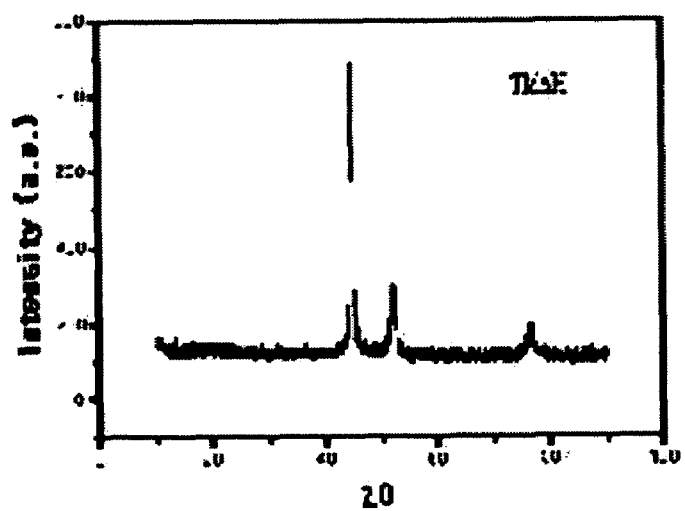

An X-ray diffraction (XRD) analysis of the metallic nickel powders of Example 1 was performed at angles of 5° and 85° and the results are shown in FIG. 2. As shown in FIG. 2, it can be seen that the metallic nickel powders of Example 1 are pure metallic nickel with a cubic crystal structure that is free of impurities such as nickel oxide and nickel hydroxide.

The sodium content of the metallic nickel powders of Example 1 was determined using induce-coupled plasma (ICP) method. The sodium content of the metallic nickel powders of Example 1 was 9.2 ppm.

Example 2

TMAH/H$_2$O 23 g of TMAH and 68 g of distilled water were dissolved in 250 ml of ethylene glycol to prepare a first solution. 20 g of Ni(CH$_3$COO)$_2$.4H$_2$O was dissolved in 250 ml of ethylene glycol to prepare a second solution. 0.0332 g of K$_2$PtCl$_4$, which is a nucleation agent, was dissolved in 2 ml of ethylene glycol to prepare a third solution. The first solution, the second solution, and the third solution were placed into a reactor provided with a reflux condenser and then stirred.

The resultant mixture in the reactor was heated using a heating mantle equipped with a magnetic stirrer at 190° C. for 6 hours to produce metallic nickel powders. The produced metallic nickel powders were separated with filtration and then washed with distilled water. The metallic nickel powders thus obtained were dried in a vacuum oven at 25° C. overnight.

Figure 3:
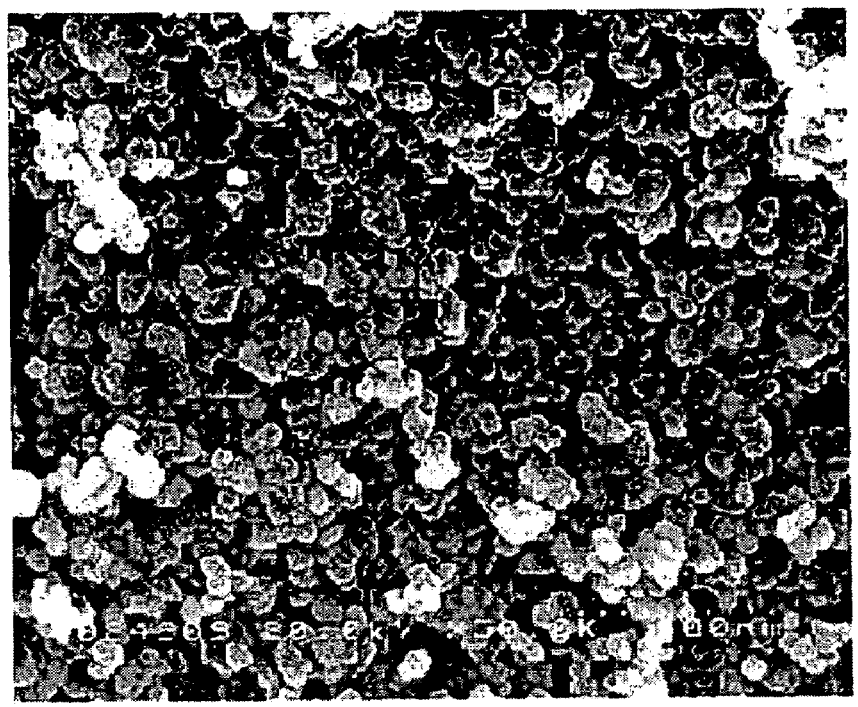
FIGS. 3 and 4 are respectively a SEM photograph and a XRD analysis result of metallic nickel powders according to another embodiment of the present invention.

The metallic nickel powders of Example 2 were photographed using a SEM and the results are shown in FIG. 3. As shown in FIG. 3, the metallic nickel powders of Example 2 were spherical and had a particle size of about 50 to about 110 nm.

Figure 4:
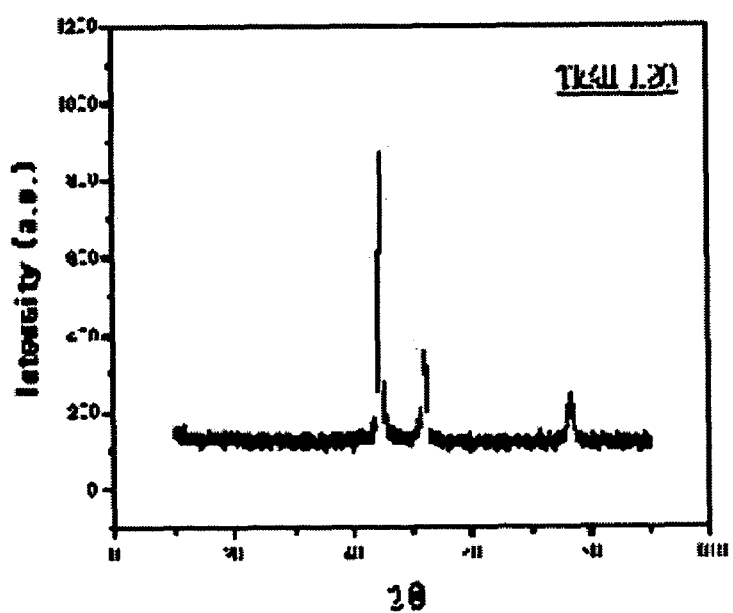

An XRD analysis of the metallic nickel powders of Example 2 was performed at angles of 5° and 85° and the results are shown in FIG. 4. As shown in FIG. 4, it can be seen that the metallic nickel powders of Example 2 are metallic nickel free of nickel hydroxide. The sodium content of the metallic nickel powders of Example 2 was 9.5 ppm.

Example 3

TEAH/H$_2$O 185 g of an aqueous solution containing 20 wt % of TEAH (tetraethylammonium hydroxide) was dissolved in 250 ml of ethylene glycol to prepare a first solution. 20 g of Ni(CH$_3$COO)$_2$.4H$_2$O was dissolved in 250 ml of ethylene glycol to prepare a second solution. 0.0332 g of K$_2$PtCl$_4$, which is a nucleation agent, was dissolved in 2 ml of ethylene glycol to prepare a third solution. The first solution, the second solution, and the third solution were placed into a reactor and then stirred.

The resultant mixture in the reactor was heated using a heating mantle equipped with a magnetic stirrer at 190° C. for 6 hours to produce metallic nickel powders. The produced metallic nickel powders were separated with filtration and then washed with distilled water. The metallic nickel powders thus obtained were dried in a vacuum oven at 25° C. overnight.

Figure 5:
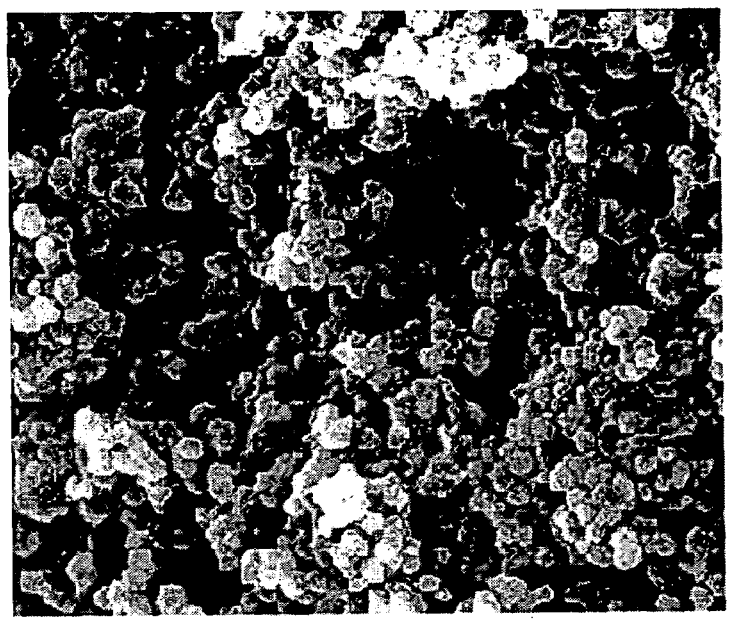
FIGS. 5 and 6 are respectively a SEM photograph and a XRD analysis result of metallic nickel powders according to another embodiment of the present invention.

The metallic nickel powders of Example 3 were photographed using a SEM and the results are shown in FIG. 5. As shown in FIG. 5, the metallic nickel powders of Example 3 were spherical and had a particle size of about 50 to about 110 nm.

Figure 6:
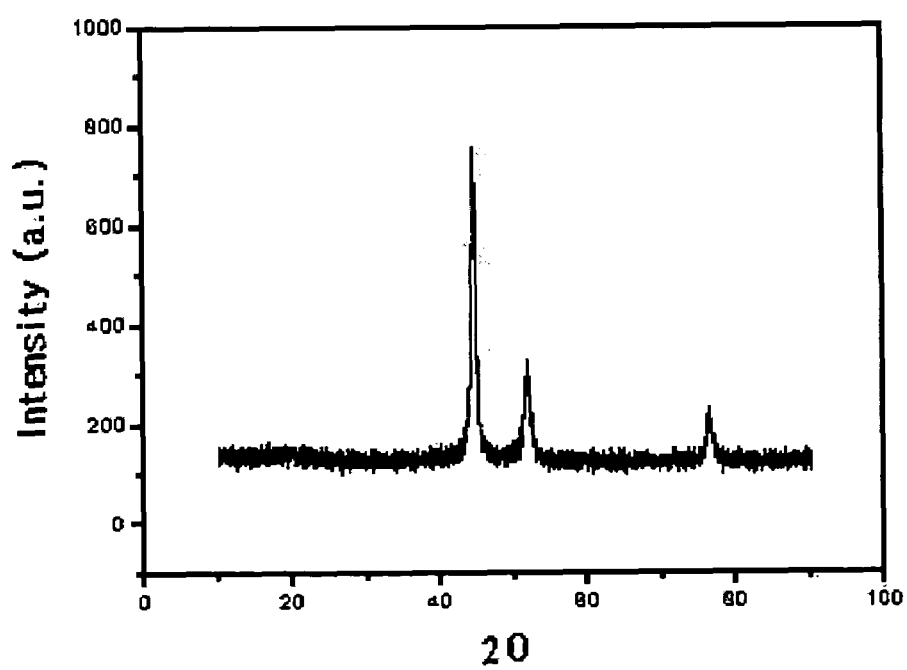

An XRD analysis of the metallic nickel powders of Example 3 was performed at angles of 5° and 85° and the results are shown in FIG. 6. The XRD analysis result shows that the metallic nickel powders free of nickel hydroxide were synthesized. The sodium content of the metallic nickel powders of Example 3 was 8.7 ppm.

Example 4

TMAH/MeOH 23 g of TMAH and 68 g of methanol were dissolved in 250 ml of ethylene glycol to prepare a first solution. 20 g of Ni(CH$_3$COO)$_2$.4H$_2$O was dissolved in 250 ml of ethylene glycol to prepare a second solution. 0.0332 g of K$_2$PtCl$_4$, which is a nucleation agent, was dissolved in 2 ml of ethylene glycol to prepare a third solution. The first solution, the second solution, and the third solution were placed into a reactor and then stirred.

The resultant mixture in the reactor was heated using a heating mantle equipped with a magnetic stirrer at 190° C. for 6 hours to produce metallic nickel powders. The produced metallic nickel powders were separated with filtration and then washed with distilled water. The metallic nickel powders thus obtained were dried in a vacuum oven at 25° C. overnight.

Figure 7:
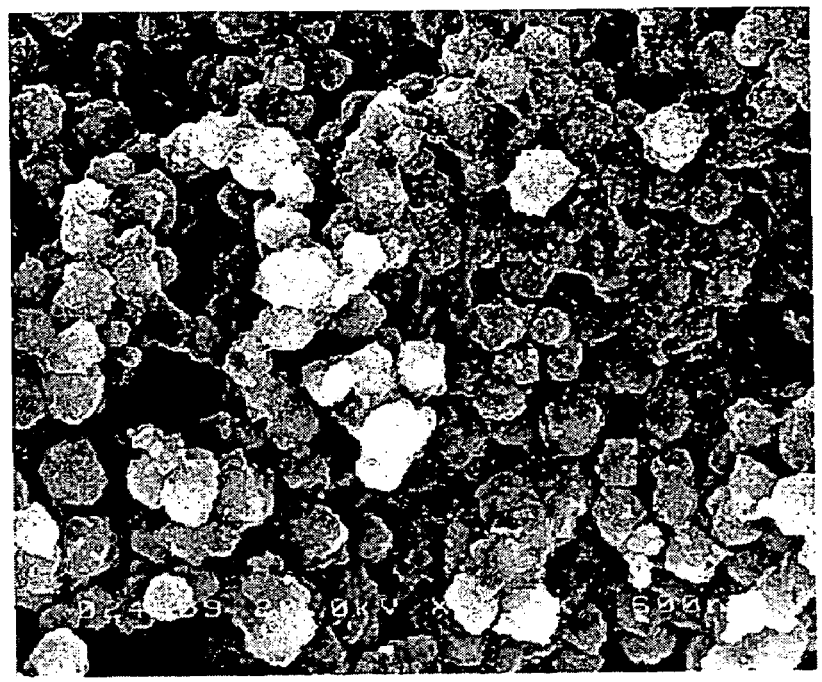
FIGS. 7 and 8 are respectively a SEM photograph and a XRD analysis result of metallic nickel powders according to another embodiment of the present invention.

The metallic nickel powders of Example 4 were photographed using a SEM and the results are shown in FIG. 7. As shown in FIG. 7, the metallic nickel powders of Example 4 were spherical and had a particle size of about 120 to about 220 nm.

Figure 8:
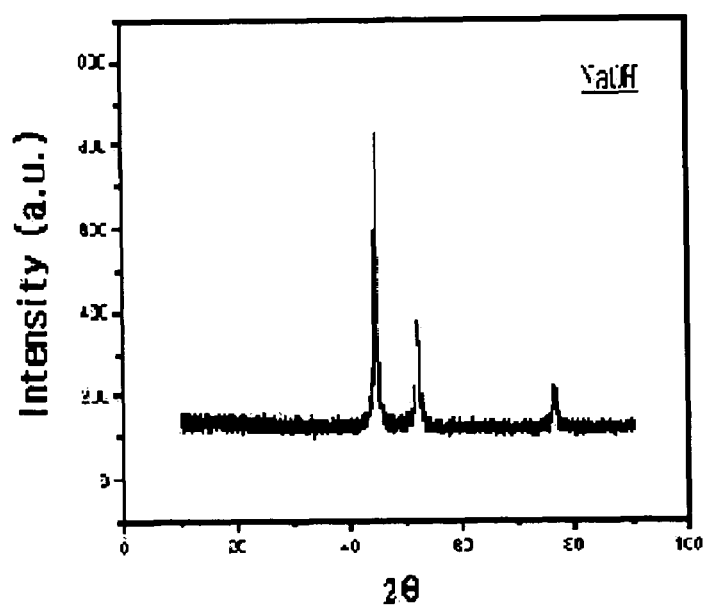

An XRD analysis of the metallic nickel powders of Example 4 was performed at angles of 5° and 85° and the results are shown in FIG. 8. The XRD analysis result shows that the metallic nickel powders free of nickel hydroxide were synthesized. The sodium content of the metallic nickel powders of Example 4 was 13.6 ppm.

Example 5

TMA/H$_2$O 50 g of an aqueous solution containing 30 wt % TMA (trimethylamine) was dissolved in 250 ml of ethylene glycol to prepare a first solution. 20 g of Ni(CH$_3$COO)$_2$.4H$_2$O was dissolved in 250 ml of ethylene glycol to prepare a second solution. 0.0332 g of K$_2$PtCl$_4$, which is a nucleation agent, was dissolved in 2 ml of ethylene glycol to prepare a third solution. The first solution, the second solution, and the third solution were placed into a reactor and then stirred.

The resultant mixture in the reactor was heated using a heating mantle equipped with a magnetic stirrer at 190° C. for 6 hours to produce metallic nickel powders. The produced metallic nickel powders were separated with filtration and then washed with distilled water. The metallic nickel powders thus obtained were dried in a vacuum oven at 25° C. overnight.

Figure 9:
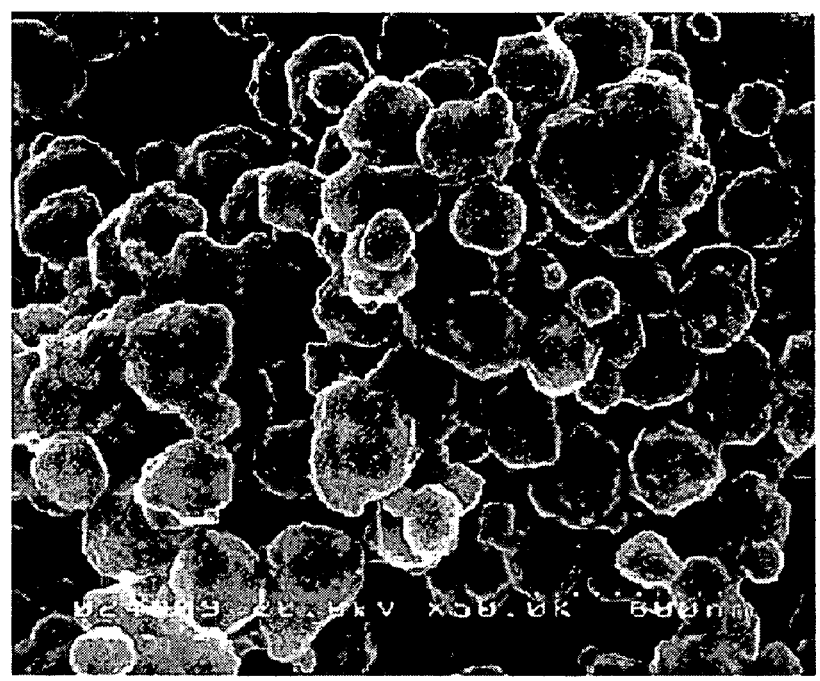
FIGS. 9 and 10 are respectively a SEM photograph and a XRD analysis result of metallic nickel powders according to another embodiment of the present invention.
Figure 10:
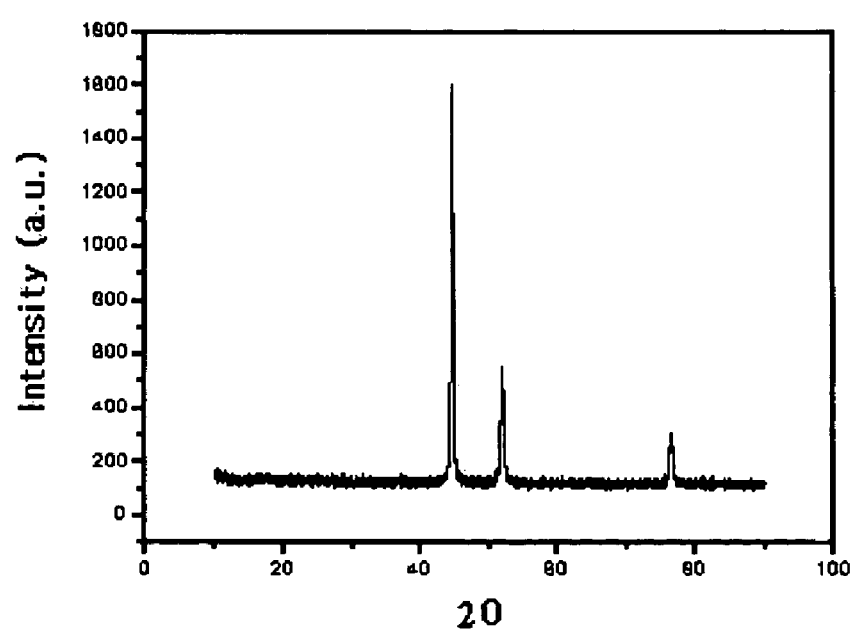

The metallic nickel powders of Example 5 were photographed using a SEM and the results are shown in FIG. 9. As shown in FIG. 9, the metallic nickel powders of Example 5 were spherical and had a particle size of about 120 to 300 nm. An XRD analysis of the metallic nickel powders of Example 5 was performed at angles of 5° and 85° and the results are shown in FIG. 10. The XRD analysis result shows that the metallic nickel powders free of nickel hydroxide were synthesized. The sodium content of the metallic nickel powders of Example 5 was 8.7 ppm.

Comparative Example 1

NAOH 10 g of NaOH, which is an inorganic base, was dissolved in 250 ml of ethylene glycol to prepare a first solution. 20 g of Ni(CH$_3$COO)$_2$.4H$_2$O was dissolved in 250 ml of ethylene glycol to prepare a second solution. 0.0332 g of K$_2$PtCl$_4$, which is a nucleation agent, was dissolved in 2 ml of ethylene glycol to prepare a third solution. The first solution, the second solution, and the third solution were placed into a reactor and then stirred.

The resultant mixture in the reactor was heated using a heating mantle equipped with a magnetic stirrer at 190° C. for 6 hours to produce metallic nickel powders. The produced metallic nickel powders were separated with filtration and then washed with distilled water. The metallic nickel powders thus obtained were dried in a vacuum oven at 25° C. overnight.

Figure 11:
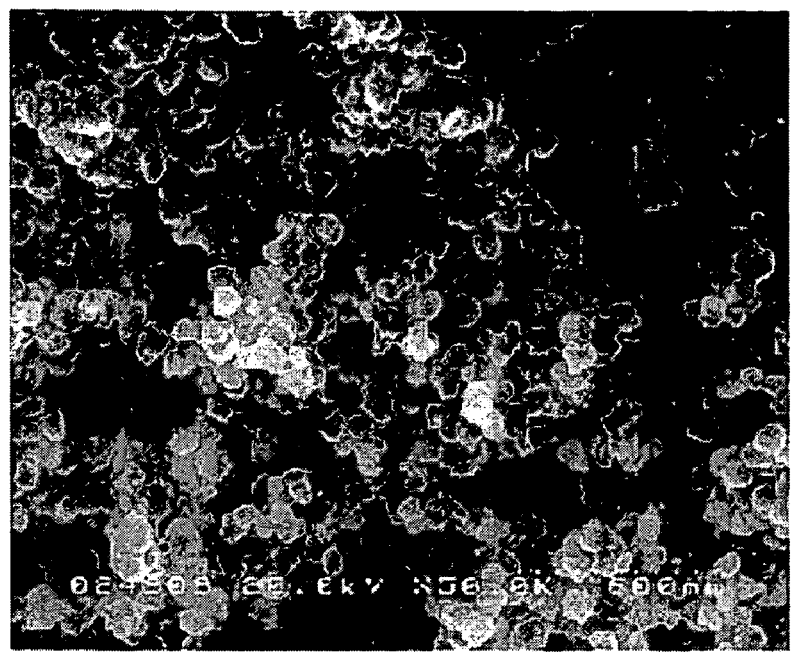
FIGS. 11 and 12 are respectively a SEM photograph and a XRD analysis result of metallic nickel powders according to a comparative example.

The metallic nickel powders of Comparative Example 1 were photographed using a SEM and the results are shown in FIG. 11. As shown in FIG. 11, the metallic nickel powders of Comparative Example 1 were spherical and had a particle size of about 50 to 110 nm.

Figure 12:
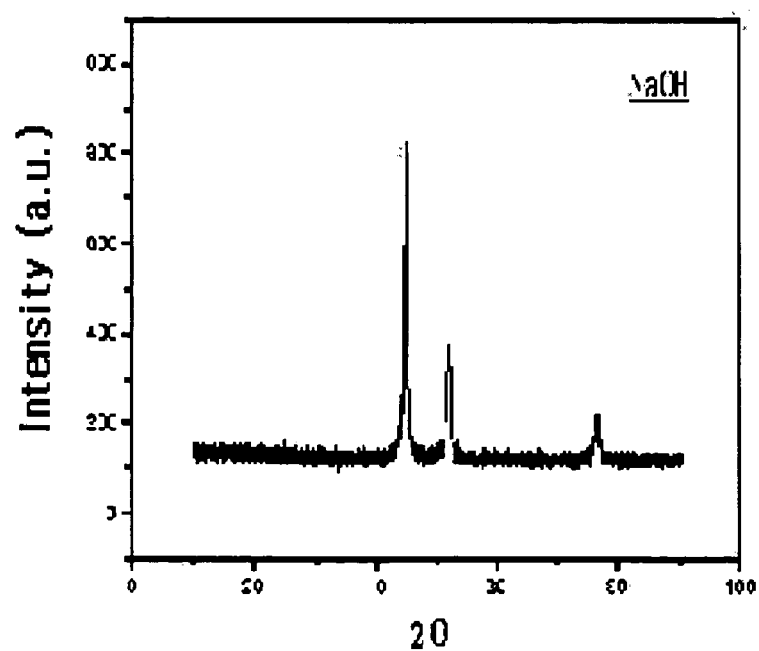

An XRD analysis of the metallic nickel powders of Comparative Example 1 was performed at angles of 5° and 85° and the results are shown in FIG. 12. The XRD analysis result shows that the metallic nickel powders of Comparative Example 1 are pure metallic nickel with a cubic crystal structure that is free of impurities such as nickel oxide and nickel hydroxide. The sodium content of the metallic nickel powders of Comparative Example 1 was 95 ppm.

Comparative Example 2

NaOH/H$_2$O 10 g of NaOH, which is an inorganic base, and 68 g of distilled water were dissolved in 250 ml of ethylene glycol to prepare a first solution. 20 g of Ni(CH$_3$COO)$_2$.4H$_2$O was dissolved in 250 ml of ethylene glycol to prepare a second solution. 0.0332 g of K$_2$PtCl$_4$, which is a nucleation agent, was dissolved in 2 ml of ethylene glycol to prepare a third solution. The first solution, the second solution, and the third solution were placed into a reactor and then stirred.

The resultant mixture in the reactor was heated using a heating mantle equipped with a magnetic stirrer at 190° C. for 6 hours to produce metallic nickel powders. The produced metallic nickel powders were separated with filtration and then washed with distilled water. The metallic nickel powders thus obtained were dried in a vacuum oven at 25° C. overnight.

Figure 13:
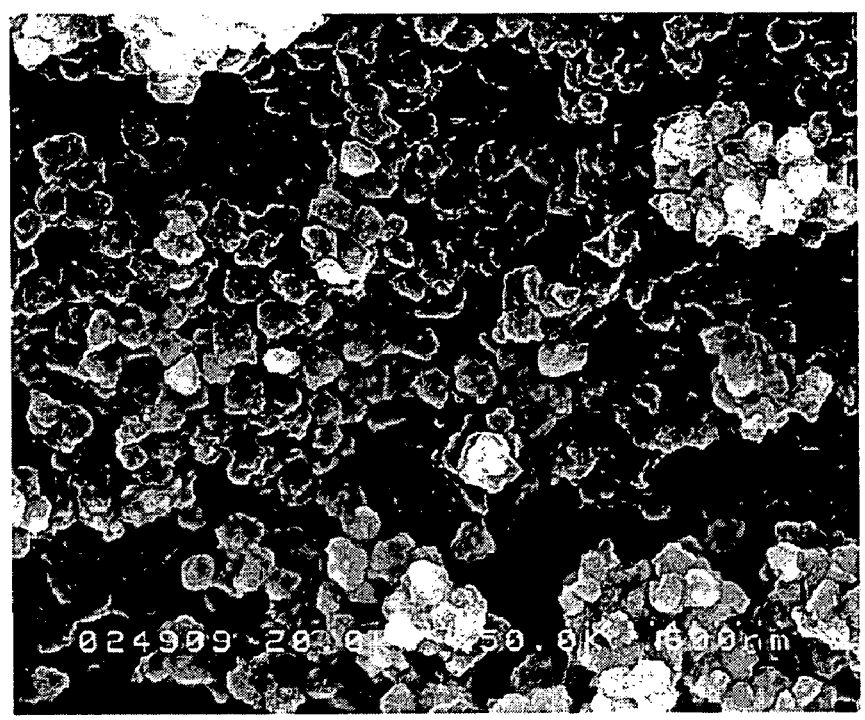
FIGS. 13 and 14 are respectively a SEM photograph and a XRD analysis result of metallic nickel powders according to another comparative example.

The metallic nickel powders of Comparative Example 2 were photographed using a SEM and the results are shown in FIG. 13. As shown in FIG. 13, the metallic nickel powders of Comparative Example 2 were severely agglomerated and had a particle size of about 90 to 120 nm. As compared with Comparative Example 1, the particle size was larger and the agglomeration of the powders was more severe.

Figure 14:
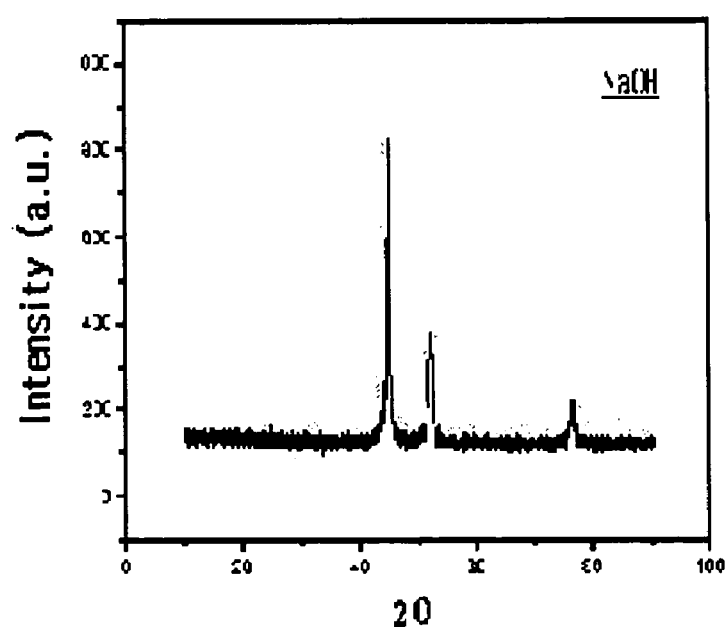

An XRD analysis of the metallic nickel powders of Comparative Example 2 was performed at angles of 5° and 85° and the results are shown in FIG. 14. The XRD analysis result shows that the metallic nickel powders of Comparative Example 2 are pure metallic nickel with a cubic crystal structure that is free of impurities such as nickel oxide and nickel hydroxide. The sodium content of the metallic nickel powders of Comparative Example 2 was 113 ppm.

Comparative Example 3

Gas Phase Method

Metallic nickel powders prepared by a gas phase method were purchased and then the sodium content thereof was analyzed. The sodium content of the metallic nickel powders prepared by a gas phase method was in a range of about 28 to 37 ppm.

According to the method of the present invention, fine, uniform metallic nickel powders with the very low content of an alkaline metal can be obtained.

Because of the fine and uniform particle size and the very low content of an alkaline metal, the metallic nickel powders of the present invention are very suitable as, in particular, a material for inner electrodes of MLCCs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for preparing metallic nickel powder, comprising heating a mixture comprising an organic base selected from the group consisting of tetramethylammonium hydroxide, tetraethylammonium hydroxide, tetrabutylammonium hydroxide, tetrapropylammonium hydroxide, benzyltrimethylammonium hydroxide, dimethyldiethylammonium hydroxide, ethyltrimethylammonium hydroxide, tetrabutylphosphonium hydroxide, trimethylamine, diethylamine, ethanolamine, and mixtures thereof, a nickel precursor compound, and a polyol,
wherein said nickel precursor compound is converted to metallic nickel powder through reduction by said organic base and said polyol.

2. The method of claim 1, wherein the heating of the mixture is carried out at a temperature of about 45 to about 350° C.

3. The method of claim 1, wherein the mixture further comprises water.

4. The method of claim 3, wherein the heating of the mixture is carried out at a temperature of about 100 to about 350° C.

5. The method of claim 3, wherein the heating the mixture comprises:
(a) heating the mixture at a temperature of about 45 to about 100° C.; and
(b) after step (a), heating the mixture at a temperature of about 100 to about 350° C. wherein during steps (a) and (b) nickel precursor compound initially is converted to nickel hydroxide and thereafter is reduced to said metallic nickel powder.

6. The method of claim 1, wherein the mixture further comprises a mono-ol.

7. The method of claim 1, wherein the mixture further comprises a nucleation agent.

8. The method of claim 7, wherein said nucleation agent is selected from the group consisting of $K_2PtCl_4$, $H_2PtCl_6$, $PdCl_2$, and $AgNO_3$.

9. The method of claim 1 wherein said nickel precursor compound is selected from the group consisting of nickel oxide, nickel sulfate, nickel nitrate, nickel chloride, nickel bromide, nickel fluoride, nickel acetate, nickel acetylacetonate, nickel hydroxide, and mixtures thereof.

10. The method of claim 1 wherein the nickel precursor compound is nickel acetate.

11. The method of claim 1 wherein said polyol is an alkylene glycol having 2 to 6 carbon atoms in the main chain.

12. The method of claim 1 wherein said polyol is selected from the group consisting of ethyleneglycol, diethyleneglycol, triethyleneglycol, tetraethyleneglycol, propanediol-1,2, propanediol-1,3, dipropyleneglycol, butanediol-1,2, butanediol-1,3, butanediol-1,4, butanediol 2,3, and mixtures thereof.

13. The method of claim 1 wherein said polyol is ethyleneglycol.

14. The method of claim 1, wherein said mixture displays a pH of about 9 or more.

15. The method of claim 1, wherein said mixture displays a pH of about 10 or more.

* * * * *